United States Patent [19]

Kuwayama et al.

[11] Patent Number: 4,850,251

[45] Date of Patent: Jul. 25, 1989

[54] HYDRAULIC CONTROL DEVICE FOR AUTOMATIC TRANSMISSION

[75] Inventors: Yoshinari Kuwayama, Tokoname; Fumitomo Yokoyama, Anjo; Masakatsu Miura, Kariya, all of Japan

[73] Assignee: Aisin-Warner Kabushiki Kaisha, Aichi, Japan

[21] Appl. No.: 172,725

[22] PCT Filed: Jun. 30, 1987

[86] PCT No.: PCT/JP87/00456

§ 371 Date: Mar. 1, 1988

§ 102(e) Date: Mar. 1, 1988

[87] PCT Pub. No.: WO88/00306

PCT Pub. Date: Jan. 14, 1988

[30] Foreign Application Priority Data

Jul. 1, 1986 [JP] Japan ................................. 61-154697

[51] Int. Cl.⁴ .............................................. B60K 41/18
[52] U.S. Cl. ......................................... 74/866; 74/869
[58] Field of Search ................................. 74/869, 866

[56] References Cited

U.S. PATENT DOCUMENTS

| | | | |
|---|---|---|---|
| 4,274,307 | 6/1981 | Iwanaga et al. | 74/869 |
| 4,308,765 | 1/1982 | Iwanaga et al. | 74/869 |
| 4,334,441 | 6/1982 | Iwanaga et al. | 74/869 X |
| 4,503,733 | 3/1985 | Hasegawa | 74/866 X |
| 4,603,604 | 8/1986 | Nishikawa et al. | 74/869 |
| 4,625,591 | 12/1986 | Nishikawa | 74/866 |
| 4,644,826 | 2/1987 | Kubo et al. | 74/866 |
| 4,648,289 | 3/1987 | Kubo et al. | 74/866 |
| 4,660,442 | 4/1987 | Nishikawa et al. | 74/869 |

FOREIGN PATENT DOCUMENTS

| | | | |
|---|---|---|---|
| 47-7052 | 2/1972 | Japan . | |
| 47-50060 | 12/1972 | Japan . | |
| 0013846 | 1/1987 | Japan | 74/866 |

Primary Examiner—Dirk Wright
Attorney, Agent, or Firm—Wenderoth, Lind & Ponack

[57] ABSTRACT

A hydraulic control device of an automatic transmission for a vehicle utilizes a shift valve for shifting at a high speed stage to prevent creeping and provide a hill-stop mechanism. The shift valve for shifting at the high speed stage has a port open to a forward clutch hydraulic servo, a port communicating with a brake hydraulic servo, and a port receiving modulator pressure from a modulator valve. A solenoid valve controlling the shift valve is in turn controlled by signals issued when the vehicle stops and begins to travel, and the modulator valve is controlled by a linear solenoid throttle valve. The modulator pressure is applied to the forward clutch hydraulic servo, and line pressure is applied to the brake hydraulic servo when the vehicle stops. Line pressure is applied to the forward clutch hydraulic servo and line pressure to the brake hydraulic servo is drained when the vehicle runs.

4 Claims, 4 Drawing Sheets

FIG. 4

| POSITION | | SOLENOID 51 | 52 | 53 | 54 | CLUTCH C₀ | C₁ | C₂ | C₃ | BRAKE B₁ | B₂ | B₃ | B₄ | O.W.C F₀ | F₁ | F₂ | F₃ |
|---|---|---|---|---|---|---|---|---|---|---|---|---|---|---|---|---|---|
| P | | × | ○ | × | | | | | | | | | ○ | | | | |
| R | STOPPING | × | ○ | × | | | ○ | | | | | ○ | ○ | | | | |
| R | RUNNING | ○ | ○ | × | | | ○ | | | | | × | ○ | | | | |
| N | | × | ○ | × | | | | | | | | | ○ | | | | |
| D | idle | × | ○ | ○ | | | △ | | | ○ | | | ○ | | | | |
| D | 1ST | × | ○ | × | | | ○ | | | | | | ○ | | | ○ | ○ |
| D | 2ND | ○ | ○ | × | ◎ | | ○ | | | | ○ | | ○ | | ○ | | ○ |
| D | 3RD | ○ | × | × | ◎ | | ○ | | ○ | | ○ | | ○ | | ○ | | |
| D | 4TH | × | × | × | ◎ | ○ | ○ | | | | ○ | | ○ | | | | |
| D | 5TH | × | × | ○ | ◎ | ○ | | | | ○ | ○ | ○ | | ○ | | | |
| 3 | 1ST | × | ○ | × | | | ○ | | | | | | ○ | | | ○ | ○ |
| 3 | 2ND | ○ | ○ | × | ◎ | | ○ | | | | ○ | | ○ | | ○ | | ○ |
| 3 | 3RD | × | × | × | ◎ | ○ | ○ | | | | ○ | | ○ | | | | ○ |
| 3 | 4TH | × | × | ○ | ◎ | ○ | | | | ○ | ○ | ○ | | ○ | | | ○ |
| 2 | 1ST | × | ○ | × | | | ○ | | | | | ○ | ○ | | | ○ | ○ |
| 2 | 2ND | × | × | × | | | ○ | | ○ | | | ○ | | | | ○ | |
| 2 | (2ND) | ○ | ○ | × | | | ○ | | | | ○ | ○ | ○ | | ○ | | ○ |
| 2 | (3RD) | ○ | × | × | | | ○ | | ○ | | ○ | ○ | | | ○ | | |
| 1 | 1ST | × | ○ | × | | | ○ | | | | | ○ | ○ | | | ○ | ○ |
| 1 | (2ND) | × | × | × | | | ○ | | ○ | | | ○ | | | | ○ | |
| 1 | (3RD) | ○ | × | × | | | ○ | | ○ | | | ○ | ○ | | ○ | | |

REMARKS:
- ○ ON
- × OFF
- ◎ ON: L-UP ON / OFF: L-UP OFF
- △ PRESSURE REDUCTION

HYDRAULIC CONTROL DEVICE FOR AUTOMATIC TRANSMISSION

FIELD OF THE INVENTION

The present invention relates to a hydraulic control device suitable for a multiple-speed automatic transmission mounted in a motor vehicle. Specifically, the present invention relates to a so-called neutral control device which operates when a vehicle stops while a manual valve is in D range.

DESCRIPTION OF THE PRIOR ART

An automatic transmission in general, experiences so-called creeping by dragging torque generated by a torque converter when a vehicle stops while a manual valve is in D range. This means that a driver has to keep pressing the brake to hold the vehicle at a stop. This causes fatigue in a driver and fuel efficiency of an engine is deteriorated.

Under such circumstances, a control device utilizing a low torque transmission to prevent such creeping by automatically shifting to a higher speed-stage has been proposed.

Another device to prevent such creeping by disconnecting the forward clutch at the time when a vehicle stops has also been proposed (Japanese Pat. Nos. 59-34053, 57-107045). However the device which shifts to a higher speed-stage can prevent creeping under normal idling during the warm-up of the engine and due to a large load being applied, fuel efficiency is still deteriorated.

And, the device which disconnects a forward clutch requires exclusive shift valves and solenoid valves. This makes the device complicated. Furthermore, the device disconnecting the forward clutch again connects such a clutch at the start-up of the engine; however, to prevent shift shock, more accumulator(s) modulator valve(s) and solenoid valve(s) are necessary. This makes the device complicated and large; and thus, a cost-increase and a decline in reliability are inevitable.

In addition to the above, once the forward clutch is disconnected, no bridle means operates to allow the vehicle to start on even a slight slope. Accordingly, it is desirable for a creeping prevention device to incorporate a hill-stop device; however, as indicated above, this device requires additional brake(s) and shift valves, and so the overall structure of the automatic transmission will be complicated.

SUMMARY OF THE INVENTION

Considering the problems above, an object of the present invention is to provide a hydraulic control device for an automatic transmission which operates to prevent creeping by utilizing a shift valve for a high speed-stage which is free at the time when a vehicle stops, to decrease a shift shock at start-up and delay of response, and to enable a hill-stop.

Of plural shift valves, a shift valve (1) ((4-5) shift valve, for example) for a high speed-stage which is out of use during low speed running has a port (b) communicating with line pressure open to a port (g) communicating with a forward clutch hydraulic servo ($C_1$) during forward running. And a solenoid valve (2) to operate the shift valve (1) is controlled by signals issued at the start-up and the stop of the vehicle. When the vehicle stops, the application of line pressure ($P_L$) to forward clutch hydraulic servo ($c_1$) ceases. When the vehicle runs, line pressure ($P_L$) is applied to the forward clutch hydraulic servo ($C_1$).

Furthermore, said shift valve (1) defines the following ports: a port (i) communicating with line pressure; a port (f) which communicates with a drain; and a port (e) which communicates with a brake hydraulic servo ($B_1$) (2nd coast brake, for example) to regulate the movement of the vehicle. When the vehicle stops, line pressure ($P_L$) is applied to the brake hydraulic servo ($B_1$), and when the vehicle runs, line pressure in the brake hydraulic servo ($B_1$) is drained.

In addition, the shift valve has a port (c) to which modulator pressure ($M_0$) is applied from a modulator valve (3). The modulator valve (3) is controlled by a controlling means of the modulator valve (3) (for example, a linear solenoid throttle valve). The modulator pressure ($M_0$) suitably modulated by the modulator valve (3) is applied to the forward clutch hydraulic servo ($C_1$) but when the vehicle is running, the application of the modulator pressure ($M_0$) to the hydraulic servo ($C_1$) is discontinued.

Based on the above structure, when shifting to the highest speed-stage, the shift valve (1) is shifted to the "upper half position" due to the solenoid valve 2 being "ON". The application of line pressure ($P_L$) to the forward clutch hydraulic servo ($C_1$) is discontinued and line pressure is applied to the brake hydraulic servo ($B_1$). Then the automatic transmission is changed to a rapid rotary condition.

Therefore when a vehicle stops while a manual valve is in D range, the automatic transmission is under a first speed condition, and the shift valve (1) is out of use. Under this condition, once signals such as the throttle opening being zero, a brake pedal being "ON", and vehicle speed being zero, are issued, the controlling unit (6) switches the solenoid valve (2) "ON". Then, line pressure is applied to a control oil chamber (a) with the shift valve (1) shifted to the "upper half position". Line pressure from the port (b) is discontinued, modulator pressure ($M_0$) from the port (c) is applied to the forward clutch hydraulic servo ($C_1$), and line pressure from the port (i) is applied to the brake hydraulic servo ($B_1$). At this time the modulator valve (3) is controlled by a linear solenoid throttle valve (5), etc. to modulate pressure just below the level at which the clutch ($C_1$) is disengaged and dragging torque occurs. Under this condition, the forward clutch ($C_1$) is disengaged, the engine output and vehicle wheels are disengaged, and the (2nd coast) brake is applied so that the regression of the vehicle is prevented.

Once a running signal is issued to the controlling unit (6), the solenoid valve (2) is switched "OFF", and the shift valve (1) is shifted to the "lower half position". Then, line pressure from the port (b) is applied to the clutch hydraulic servo ($C_1$), and the port (e) which communicates with the servo ($B_1$) communicates with the port (f) open to the drain, and the brake ($B_1$) is released. Therefore, the vehicle starts in first speed. At this moment, as stated before, since line pressure to the clutch servo ($C_1$) is just below the level at which the clutch is engaged, the clutch servo ($C_1$) is smoothly engaged with good response and the vehicle starts running smoothly.

As explained, the forward clutch ($C_1$) is disengaged, and accordingly, the engine is not loaded when the vehicle stops. Further, fuel efficiency is improved and creeping is ensuredly prevented. Additionally, an additional shift valve is not required because a shift valve (10) which is out of use during low speed engine running is provided and the solenoid valve (2) for high speed shifting is utilized without a modification thereof. This prevents the device from becoming complicated.

In addition, since the (4–5) shift valve to control the forward clutch hydraulic servo ($C_1$) and the first brake hydraulic servo ($B_1$) is utilized as a high speed shift valve, then the (4–5) shift valve does not have to be modified so that a cost increase is prevented.

When the forward clutch ($C_1$) is disengaged at the same time the brake ($B_1$) (or, $B_1$ and $B_3$) is engaged, movement of the vehicle on a slope is prevented and even if a vehicle is on a slope, the driver can leave his foot off the brake. Consequently, driving becomes easy and less tiresome.

And the modulator pressure ($M_0$) from the modulator valve (3) is so applied to the forward clutch hydraulic servo ($C_1$) that the response-delay at start-up and shift shock is decreased greatly.

Furthermore, if the modulator valve (3) is controlled by the throttle valve (5) which in turn is controlled by the linear solenoid valve, no additional valve to control the modulator valve is required, so that a further complication of the device is prevented.

BRIEF DESCRIPTION OF THE DRAWINGS

In the accompanying drawings,

FIG. 4 is a table of operation.

DETAILED DESCRIPTION OF THE PREFERRED EMBODIMENT

The following is a detailed description of the preferred embodiment according to the present invention.

Figure 2:
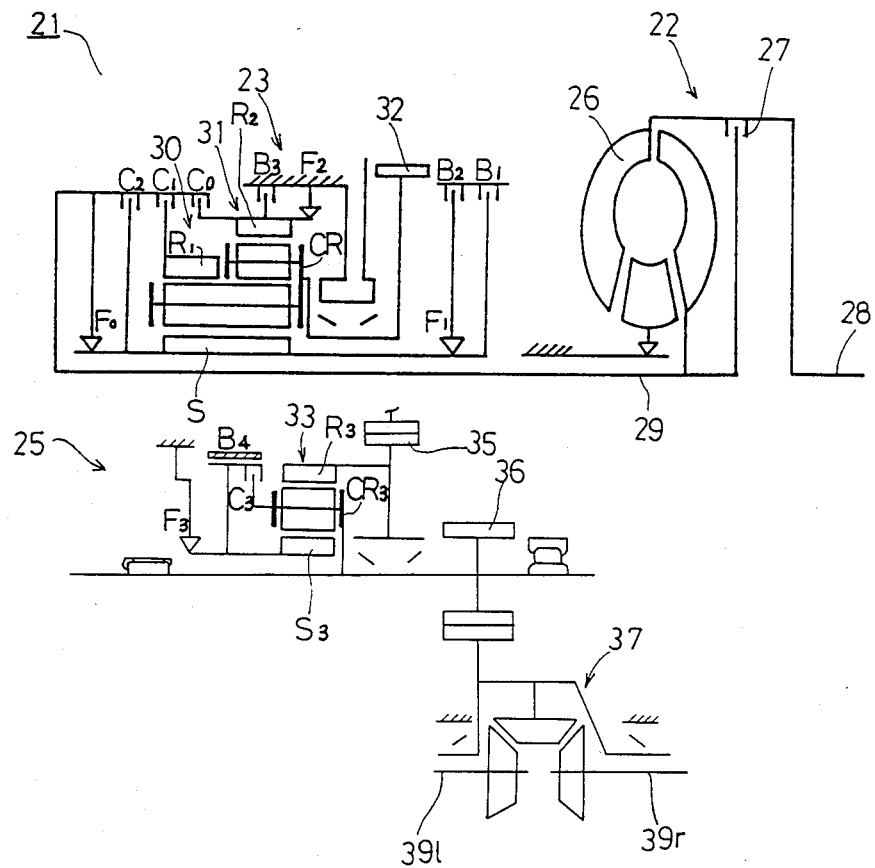
FIG. 2 is a schematic drawing of a suitable automatic transmission to which the present invention is applicable.

A five speed automatic transmission 21 comprises a torque converter portion 22, a four speed automatic transmission mechanism portion 23 and an under drive mechanism portion 25, as shown in FIG. 2.

The torque converter portion 22 includes a torque converter 26 and a lock-up clutch 27. An engine crankshaft 28 is connected with an input shaft 29 through oil by the torque converter 26 or through a mechanical coupling by the lock-up clutch 27. planetary gear unit 31. Each gear unit has a carrier CR and a sun gear S. The carriers CR are connected to one another to form an integrated body; and the sun gears are connected to one another to form an integrated body, too. Still further, the input shaft 29 is coupled with the ring gear $R_1$ of the single planetary gear unit 30 through the first (forward) clutch $C_1$ and is also coupled with the sun gear S through the second (direct) clutch $C_2$. The sun gear S is braked directly by the first (2nd coast) brake $B_1$ and the rotation thereof in one direction is regulated by the second (2nd) brake $B_2$ through a first one-way clutch $F_1$. The ring gear $R_2$ of the dual planetary gear unit 31 is braked directly by the third (1st and Rev) brake $B_3$ and the rotation of the ring gear $R_2$ in one direction is regulated by a second one-way clutch $F_2$. Furthermore, the input shaft 29 is connected with said ring gear $R_2$ of the dual planetary gear 31 through a third clutch $C_0$ and a third one-way clutch $F_0$ is operatively connected between the input shaft 29 and the sun gear S in order to limit the rotation of the sun gear S to that of the input shaft 29. Further, the carrier CR is connected with the counterdrive gear 32 which is the output member of the four speed automatic transmission mechanism portion 23.

On the other hand, the under drive mechanism portion 25 having a single planetary gear unit 33 including a ring gear $R_3$ is connected with a counterdriven gear 35 which is always engaged with the counterdrive gear 32; and a carrier $CR_3$ is connected with the output pinion 36. Further, the rotation of the sun gear $S_3$ in one direction is regulated by the fourth one-way clutch $F_3$; the sun gear $S_3$ is braked by the fourth brake $B_4$ and is coupled with the carrier $CR_3$ through the fourth clutch $C_3$.

As for the output pinion 36, it is connected with the right and left axles $39r$, $39l$ through the differential device 37.

Figure 3:
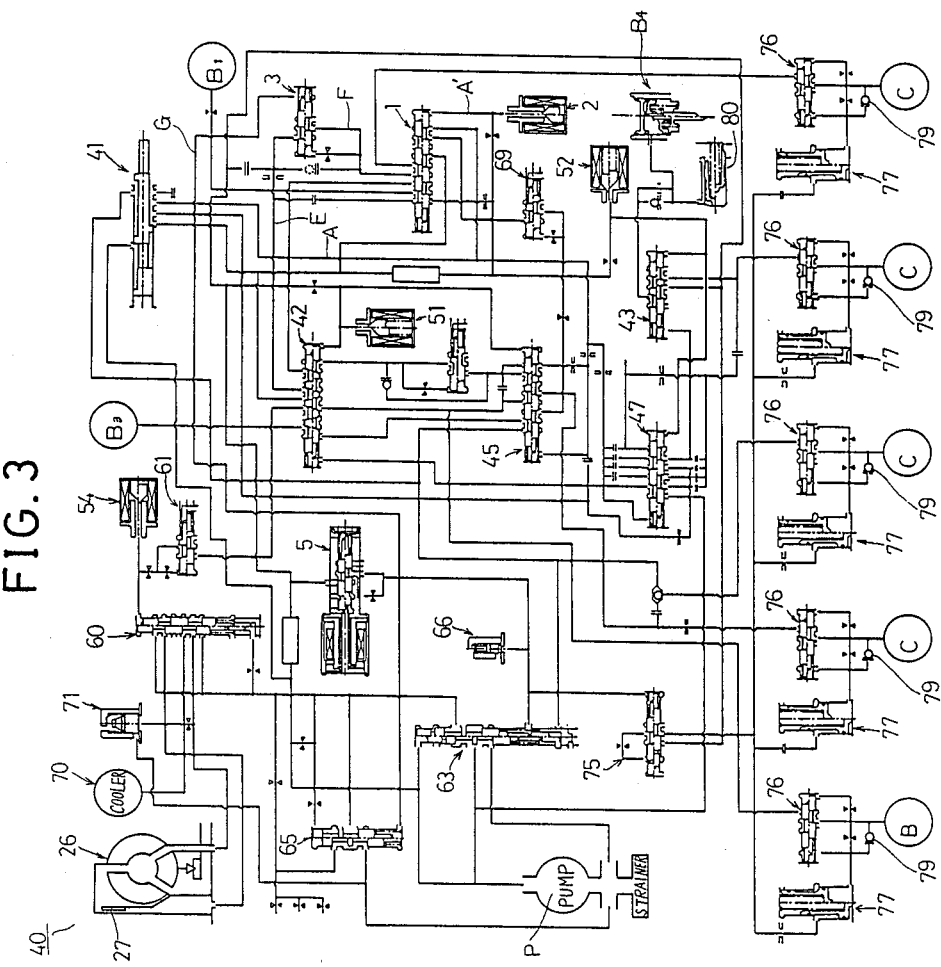
FIG. 3 is a schematic diagram of a hydraulic circuit according to the present invention.

The five speed automatic transmission 21 is controlled and operated by a hydraulic circuit 40 shown in FIG. 3.

In this circuit $C_0$, $C_1$, $C_2$ and $C_3$ are the hydraulic servos for the clutches, and $B_1$, $B_2$, $B_3$ and $B_4$ are the hydraulic servos for the brakes. Reference numeral 41 designates the manual valves 42 the (1–2) shift valve, 43 the (2–3) shift valve, 45 the (3–4) shift valve, 1 the (4–5) shift valve which is the high speed shift valve of the present invention and 47 the down shift control valve. Reference number 51 designates the first solenoid valve to control the first and second shift valve 42, 45. Reference numeral 52 designates the second solenoid valve to control the third shift valve 43 and down shift control valve 47. Reference number 2 designates the third solenoid valve to control the shift valve 1 and the valve 2 effects the neutral control. Reference numeral 60 designates lock-up control valve and 54 the fourth solenoid valve to duty control the lock-up control valve 60. Reference numeral 61 designates a lock-up modulator valve to stabilize duty control by the fourth solenoid valve S4. Reference numeral 63 designates a primary regulator valve, 65 a secondary regulator valve, 66 a pressure release valve, 67 a C1 modulator valve, 68 a second modulator valve and 69 a low modulator valve. Reference number 70 designates a cooler, 71 a cooler by-pass valve and 5 a throttle valve comprising a linear solenoid valve making up an operation means for the modulator valve of the present invention. Reference number 75 designates an accumulator control valve, 26 a torque converter, 27 a lock-up clutch and P a hydraulic pump. The hydraulic servo of the first clutch $C_1$, that of the second clutch $C_2$, that of the third clutch $C_0$, that of the fourth clutch $C_3$, and the second hydraulic servo for the second brake $B_2$ are each connected to a regulator valve 76, an accumulator 77 and a check valve 79. An accumulator 80 which is a sitting type is connected to the fourth brake hydraulic servo $B_4$.

In FIG. 3, a symbol, similar to that used to represent a capacitor, represents a separator plate blocking the oil paths when the hydraulic device is utilized in a four speed automatic transmission.

Figure 1:
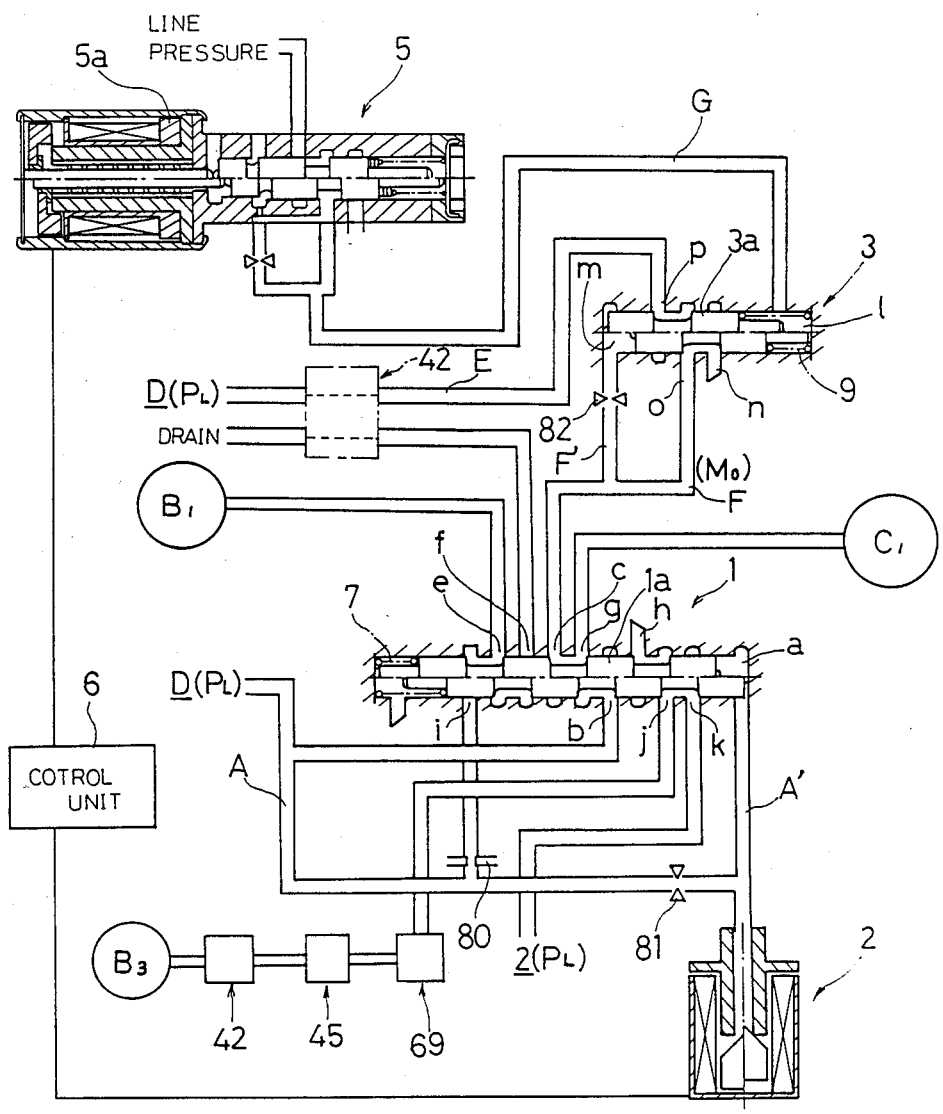
FIG. 1 is a cross-sectional view of the hydraulic control device according to the present invention.

The (4–5) shift valve 1 utilized as the "high speed" shift valve, as shown in FIG. 1, has a spool $1a$ provided with a spring 7. At the side opposite the spring side, a control chamber "a" communicating with line pressure from the solenoid valve 2 is defined. In addition, the shift valve has the following ports: a port "g" communicating with the first forward clutch hydraulic servo $C_1$; a port "e" communicating with the first (2nd coast)

brake hydraulic servo $B_1$; a drain port "h"; and other ports "b", "c", "d", "f", "i", "j", "k". The port "b" communicates with a D port of the manual valve where line pressure is applied in D range through an oil path A. And the oil path "A" communicates with the port "i" through an orifice 80, and communicates with an oil path A' through an orifice 81 disposed in the oil path A. The port "c" communicates with a $C_1$ modulator valve 3 which is described below. The port "f" communicates with the (1–2) valve 42, and with the drain port of the shift valve 42 when the vehicle is in first speed. The port "k" communicates with a "2" port of the manual valve. And the port "j" communicates with the third (1st and Rev.) brake $B_3$ through the modulator valve 69, the (3–4) shift valve 45 and the (1–2) shift valve 42.

The $C_1$ modulator valve 3 has a spool 3a, a side defining a control oil chamber 1 in which a spring 9 is disposed, and another side defining a feed back chamber m. In addition, the $C_1$ modulator valve 3 has a drain port "n" and ports "o", and "p". The port "c" of the (4–5) shift valve 1 communicates with the feed back chamber m through an oil path F' branched off from the oil path F, and through an orifice 82. The port "p" communicates with the (1–2) shift valve 42 through an oil path E. When the shift valve 42 is in a first speed position ("upper half position" in FIG. 3), the oil path E communicates with the oil path A (through the D port of the manual valve 41). And when the shift valve is out of the first speed position ("lower half position" in FIG. 3), the oil path E communicates with the drain port. The control oil chamber "l" communicates with an oil path "G" from the throttle valve 5. The throttle valve 5 controls the line pressure in the oil path G via the linear solenoid valve 5a which is controlled based on the signals from the controlling unit 6.

Now the operation of the present invention will be described in detail. A five speed automatic transmission 21 provides the first to the fifth speed of each range set by the manual valve 41. At each range of the manual valve 41, the first to the fourth solenoid valves (51, 52, 53 and 54) in the hydraulic control circuit 40 operate in accordance with FIG. 4 and the clutches $C_0$–$C_3$, the brakes $B_1$–$B_4$, and the one way clutches $F_0$–$F_3$ are controlled by the solenoid valves.

At the first speed of D range, the second solenoid valve 52 is "ON". The first forward clutch $C_1$ is engaged and the fourth brake $B_4$ operates. The rotation of the input shaft 29 is transmitted to the ring gear $R_1$ of the single unit 30 through the clutch $C_1$. At this time, the ring gear $R_2$ of the dual unit 31 which is restrained by the second one-way clutch $F_2$ rotates the sun gear S in a reverse direction without load, and the common carrier CR is rotated in a normal direction and at a retarded speed. The rotation is transmitted from the counterdrive gear 32 to the counterdriven gear 35 of the under drive mechanism (U/D) 25. The under drive mechanism 25 is in an "under drive condition" due to the motion of the fourth brake $B_4$ and the fourth one-way clutch $F_3$. Consequently, the automatic transmission 21 outputs first (1st) speed due to the combination of the first speed of the four speed automatic transmission 23 and the under drive condition of the under drive mechanism 25.

At the second speed in D range, the first solenoid valve 51 is "ON" in addition to the second solenoid valve 52. The second brake $B_2$ operates in addition to the engagement of the first forward clutch $C_1$. Then, the rotation of the sun gear S is restrained by the first one-way clutch $F_1$ based on the second brake $B_2$; accordingly, the rotation of the ring gear $R_1$ from the input shaft 29 rotates the ring gear $R_2$ of the dual unit 31 in a normal direction without load and rotates the common carrier CR in a normal direction at a reduced speed. The rotation is transmitted from the counterdrive gear 32 to the counterdriven gear 35 of the under drive mechanism 25. The under drive mechanism 25 is in an "under drive condition". Consequently, the automatic transmission 21 outputs the second speed due to the combination of the second speed of the four speed automatic transmission 23 and the under drive condition of the under drive mechanism 25.

At the third speed in D range, the second solenoid valve 52 is "OFF" while the first solenoid valve 51 is "OFF". The four speed automatic transmission 23 is kept under the second speed. At this time the fourth brake $B_4$ is released and the fourth clutch $C_3$ is engaged, with the under drive mechanism in a direct coupling condition. Consequently, the automatic transmission 21 outputs third speed due to the combination of the second speed of the four speed automatic transmission 23 and the direct coupling of the under drive mechanism 25.

At the fourth speed in D range, the first solenoid valve 51 is also "OFF" and accordingly all of the solenoid valves are "OFF". The first forward clutch $C_1$, the fourth clutch $C_3$ and the third clutch $C_0$ are engaged in addition to the second brake $B_2$. Then, the rotation of the input shaft 29 is transmitted to the ring gear $R_1$ of the single unit 30 through the clutch $C_1$. At this time, the rotation of input shaft 29 is transmitted to the ring gear $R_2$ of the dual unit 31 through clutch $C_0$. Then, the components of the planetary gear units 30 and 31 rotate together, and from the carrier CR, the rotation of the input shaft 29 is transmitted to the counterdrive gear 32 at the same rotational speed as the input shaft 29.

The rotation of the counterdrive gear 32 is combined with the direct coupling condition of the under drive mechanism 25, and thus, the fourth speed which is the same rotational speed as the input shaft 29 is obtained from the output pinion 36 in the automatic transmission 21.

At the fifth speed in D range, the third solenoid valve 2 is "ON", the first forward clutch $C_1$ is disengaged and the first brake $B_1$ operates. Then, the rotation of the input shaft 29 is transmitted to the ring gear $R_2$ of the dual unit 31 through the clutch $C_0$. At this time, since the sun gear S is restrained, the rotation of the input shaft 29 rotates the ring gear $R_1$ of the single unit rapidly without load, the carrier CR rotates rapidly, and such high speed rotation is transmitted to the counterdrive gear 32 as an "over drive". The rotation is transmitted by the counterdrive gear 32 to the counterdriven gear 35 of under drive mechanism (U/D) 25. Consequently, the automatic transmission 21 outputs the fifth speed due to the combination of the over drive condition and the direct coupling of the under drive mechanism 25. At this time due to an introduction of line pressure to control oil chamber "a" with the third solenoid valve 2 being "ON", the (4–5) shift valve 1 is shifted to the "upper half position". Consequently, the line pressure port "b" and the port "g" are disconnected so that the application of line pressure to the first forward clutch hydraulic servo $C_1$ is discontinued. At the same time, the port "g" communicates with port "c". However, under this condition, the (1–2) shift valve 42 is in the "lower half position" and the oil path E is open to the drain. The modulator pressure $M_0$ is not applied to the forward clutch hydraulic servo $C_1$ through the modulator valve 3 and the oil path F.

When a vehicle stops for a traffic signal, etc. under the condition that the manual valve is in D range, the automatic transmission 21 returns to the first speed condition with the second solenoid valve being "ON". At the same time, the controlling unit 6, receiving the signals indicative of the degree of throttle opening, the amount of pressure applied to the brake and the vehicle speed, etc., switches the third solenoid valve 2 "ON". Then, line pressure is applied to the control oil chamber "a" through the oil path A', and the (4–5) shift valve 1 assumes the "upper half position". Due to the above, as in fifth speed, the line pressure port "b" and the port "g" are disconnected. Line pressure to the forward clutch hydraulic servo $C_1$ is discontinued, and the line pressure port "i" and the port "e" are connected so that line pressure is applied to the second brake hydraulic servo $B_1$. Accordingly, the forward clutch $C_1$ is disengaged, and load on the input shaft 29 is relieved. Because of this, creeping and regression of the vehicle is prevented, the first (2nd coast) brake $B_1$ restrains the sun gear S, and one-way rotation of the ring gear $R_2$ is restrained by the second one-way clutch $F_2$. In addition, based on the (4–5) shift valve 1 being shifted to the "upper half position", the port "g" communicates with the port "c", and the modulator pressure $M_0$ from the $C_1$ modulator valve is applied to the forward clutch hydraulic servo $C_1$ through the oil path F. At the same time, the throttle valve 5 whose linear solenoid valve 5a is controlled by the signals from the controlling unit 6 adjusts the line pressure to the control oil chamber "l" through the oil path "G". Due to this, the modulator valve 3, together with the feed back pressure in the feed back chamber "m", adjusts the modulator pressure from the port "o" close to the level at which dragging torque occurs. And, when the vehicle stops, i.e. once the controlling unit receives the signals indicative of the degree of throttle opening, etc., the controlling portion switches the third solenoid valve 2 "OFF", the line pressure in the control oil chamber "a" is drained, and the (4–5) shift valve 1 assumes the "lower half position". Then the automatic transmission returns to the first speed condition. Line pressure for the first brake hydraulic servo $B_1$ is drained through the port "e", "f" and the (1–2) shift valve 42, and the brake $B_1$ is released. Line pressure is applied to the forward clutch hydraulic servo $C_1$ through the port "b", and the port "g", and the clutch $C_1$ is engaged. At this time, line pressure close to that at which dragging occurs is applied to the clutch hydraulic servo so that the vehicle can start smoothly. At the start-up, the modulator pressure $M_0$ of the modulator valve 3 is increased under the control of the linear solenoid 5a. Then, if the (4–5) shift valve 1 is shifted after the clutch $C_1$ is engaged, a smoother start-up without shift shock can be obtained.

When the manual valve 10 is shifted from N range to R range, and the vehicle stops or runs at a speed lower than a predetermined speed, the second clutch $C_2$ is engaged and the third brake $B_3$ *is operated. The rotation of the input shaft 29 is transmitted to the sun gear S through the clutch $C_2$.* Under this condition, via the third brake $B_3$, the ring gear $R_2$ of the dual unit 31 is restrained, and the ring gear $R_1$ of the single unit 30 rotates in a reverse direction so that the carrier CR also rotates in the reverse direction. This reverse rotation is transmitted through the counterdrive gear 32 to the under drive mechanism 25 which assumes the "under drive condition".

Also, if the manual valve 10 is to be shifted from N range to R range while a vehicle runs at a speed higher than a predetermined speed (7 km/h), the first solenoid valve 51 is switched "ON", and the shift valves 42 and 45 are shifted. Then, the third brake $B_3$ is released and is drained. Due to the above, shifting to R range is prevented.

At 3 range, 1st and 2nd speeds are obtained the same way as in D range, but 3rd and 4th speeds have different gear ratios. That is to say, at the 3rd stage of 3 range in the automatic transmission 21, the first clutch $C_1$ and the third clutch $C_0$ are engaged, and the second $B_2$ and the fourth brake $B_4$ are operated. The four speed automatic transmission mechanism 23 assumes the direct coupling condition and the under drive mechanism 25 assumes the under drive condition. Then the 3rd speed of 3 range is obtained.

At the 4th stage of 3 range, the third clutch $C_0$ is engaged, and the first, second and the fourth brake ($B_1$, $B_2$ and $B_4$) are operated. Then, the four speed automatic transmission mechanism 23 assumes the over drive condition and the under drive mechanism 25 assumes the under drive condition.

When the manual valve 10 is shifted to 2 range, at the 1st stage of 2 range, the third brake $B_3$ is operated in addition to the condition existing at the 1st speed of D range. Due to the above, when engine brake (reversal of input and output) occurs, this 1st speed of 2 range is maintained because the ring gear $R_2$ is restrained by the brake $B_3$, contrary to the first speed in D range.

At 2nd speed in 2 range, the first and the fourth clutch ($C_1$ and $C_3$) are engaged and the third brake $B_3$ is operated. Then, the four speed automatic transmission mechanism 23 assumes the 1st speed condition and the under drive mechanism 25 assumes the direct coupling condition. Accordingly, 2nd speed in 2 range is output. At this time, as in the case of 1st speed, the third brake $B_3$ is operated and engine brake maintains the 2nd speed. In 2 range, it is possible to obtain 2nd and 3rd speeds in the same manner as in D range as shown in the parentheses.

Furthermore, at 1 range, 1st speed is obtained in the same manner as in 2 range. As shown in the parentheses, 2nd speed is obtained in the same manner as in 2 range and 3rd speed is obtained in the same manner as in D range.

The hydraulic control device of an automatic transmission according to the present invention is applicable to any type of motor vehicle having an automatic transmission, and in particular, an automatic transmission of a "front-engine front wheel drive" type of motor vehicle.

In the preferred embodiment, the (4–5) shift valve is utilized as a high speed shift valve; however, it is a matter of necessity as to whether to utilize the (3–4) shift valve, etc. which is out of use during the first speed. In addition, the throttle valve is described as comprising a linear solenoid valve, but it may consist of a linear solenoid, a solenoid valve for dual control, the modulator valve 3 being directly controlled by the linear solenoid. Furthermore, in the preferred embodiment, only the first brake $B_1$ has been described as being operated to prevent regression, but of course the third brake $B_3$ can also be operated with the first brake $B_1$ so that not only regression but also forward moving can be prevented.

The present invention has also been described with respect to the vehicle being stopped, but it is also possible for the neutral control to apply to the running condition of the vehicle to cope with exhausted gas, etc.

And the present invention has been described with respect to a five speed automatic transmission comprising a four speed automatic transmission mechanism and an under drive mechanism. But the present invention is not limited to the above, as the hydraulic control device of the present invention is applicable to an automatic transmission comprising a three speed automatic transmission mechanism and an under drive mechanism, a split-type automatic transmission in which two planetary gear units are separated by a clutch, a general three speed automatic transmission of the Simpson Type or Ravigneaux Type, or any other type of automatic transmission having a high speed shift valve which can be out of use at a low speed.

What is claimed is:

1. In an automatic transmission of a vehicle having a transmission unit through which power is transmitted in a respective one of power transmitting paths defined therethrough, clutches and brakes operatively connected to the transmission unit for selecting the power transmitting path through which power is transmitted in the transmission unit, and hydraulic servos operatively hydraulically connected to the brakes and the clutches for operating or releasing the brakes and for engaging or disengaging the clutches, a hydraulic control device comprising:
    a plurality of shift valves operatively hydraulically connected to the hydraulic servos and to a source of line pressure, said valves movable between respective positions at which the line pressure is applied to the servos and respective positions at which the application of line pressure to the servos is interrupted,
    one of said shift valves having a first port in open hydraulic communication with the hydraulic servo of one of the clutches, the vehicle travelling forward when said one of the clutches is engaged;
    a solenoid valve operatively connected to said one of said shift valves for causing said one of said shift valves to move between the respective positions thereof; and
    control means for determining the stopping and the initiation of travelling of the vehicle,
    said control means operatively connected to said solenoid valve for controlling said solenoid valve to cause said one of said shift valves to move to a first position at which the application of line pressure to the hydraulic servo of said one of the clutches is interrupted when the vehicle stops travelling and for controlling said solenoid valve to cause said one of the shift valves to move to a second position at which the line pressure is applied to the hydraulic servo of said one of the clutches through said port when the vehicle beings travelling.

2. A hydraulic control device as claimed in claim 1, wherein said one of said shift valve has a second port in open communication with a source of line pressure, a third port in open communication with a drain, and a fourth port in open communication with the hydraulic servo of one of said brakes, and
    said second port is open to said fourth port when said one of the shift valves in said first position, and said third port is open to said fourth port when said one of the shift valves is in said second position.

3. A hydraulic control device as claimed in claim 1 or claim 2,
    wherein said one of said shift valves has another port in communication with said first port when said one of said valves is in said first position, and further comprising
    a modular valve operatively hydraulically connected to said one of said shift valves at said another port thereof for establishing a modulated hydraulic pressure introduced to the hydraulic servo of said one of the clutches via said another port when said one of said shift valves is in said first position, and modulator valve operation means operatively connected to said modulator valve for controlling the operation of said modulator valve to regulate the modulated hydraulic pressure.

4. A hydraulic control device as claimed in claim 3, wherein said modulator valve operation means comprises a throttle valve, and a linear solenoid valve operatively connected to said throttle valve for controlling the operation of said throttle valve.

* * * * *